United States Patent
Hutchins et al.

(10) Patent No.: US 10,543,860 B2
(45) Date of Patent: Jan. 28, 2020

(54) VEHICLE COMMUNICATION SYSTEM

(71) Applicant: GENERAL ELECTRIC COMPANY, Schenectady, NY (US)

(72) Inventors: Maurice Stanley Hutchins, Mims, FL (US); Gary William Mason, Rockledge, FL (US)

(73) Assignee: GB GLOBAL SOURCING LLC, Norwalk, CT (US)

( * ) Notice: Subject to any disclaimer, the term of this patent is extended or adjusted under 35 U.S.C. 154(b) by 242 days.

(21) Appl. No.: 15/242,832

(22) Filed: Aug. 22, 2016

(65) Prior Publication Data

US 2018/0052455 A1 Feb. 22, 2018

(51) Int. Cl.
| | | |
|---|---|---|
| *B61L 15/00* | (2006.01) | |
| *B61C 17/12* | (2006.01) | |
| *B61L 3/12* | (2006.01) | |
| *G08G 1/00* | (2006.01) | |
| *H04L 29/08* | (2006.01) | |

(52) U.S. Cl.
CPC .......... *B61L 15/0027* (2013.01); *B61C 17/12* (2013.01); *B61L 3/127* (2013.01); *G08G 1/22* (2013.01); *B61L 15/0072* (2013.01); *H04L 67/12* (2013.01)

(58) Field of Classification Search
CPC .. B61C 17/12; B61L 15/0027; B61L 15/0072; B61L 3/127; G05D 1/0016; G05D 1/0022; G05D 1/0027; G05D 1/028; H04L 67/12; G08G 1/22
USPC .......................................................... 701/2
See application file for complete search history.

(56) References Cited

U.S. PATENT DOCUMENTS

| | | | | | |
|---|---|---|---|---|---|
| 3,380,399 | A | * | 4/1968 | Southard | B60L 15/32 105/61 |
| 6,401,015 | B1 | * | 6/2002 | Stewart | B60T 13/665 303/7 |
| 6,470,245 | B1 | * | 10/2002 | Proulx | B61L 3/127 104/295 |
| 6,854,691 | B2 | * | 2/2005 | Kraeling | B61L 3/127 246/167 R |
| 7,264,208 | B2 | * | 9/2007 | Kovach | A63H 18/16 104/295 |

(Continued)

*Primary Examiner* — Angelina Shudy
(74) *Attorney, Agent, or Firm* — Joseph F. Harding; The Small Patent Law Group, LLC

(57) ABSTRACT

A communication system includes a first communication device disposed onboard a displaced vehicle. The first communication device communicates with a second communication device onboard a lead vehicle of a vehicle system for the lead vehicle to remotely control operation of the vehicle system. The first communication device receives a reconfiguration signal from the second communication device. A remote control (RC) communication device is disposed onboard the first displaced vehicle. The RC communication device wirelessly receives a control signal from an operator control unit (OCU) for the OCU to remotely control the first displaced vehicle. A communication controller reconfigures the RC communication device to repeat the control signal from the OCU responsive to the first communication device of the first displaced vehicle receiving the reconfiguration signal from the second communication device of the lead vehicle or another reconfiguration signal from an off-board or on-board location.

11 Claims, 4 Drawing Sheets

(56) References Cited

U.S. PATENT DOCUMENTS

| | | | |
|---|---|---|---|
| 7,500,436 B2* | 3/2009 | Kumar | B60L 11/123 105/26.05 |
| 7,653,465 B1* | 1/2010 | Geiger | B61L 3/127 701/19 |
| 7,664,459 B2 | 2/2010 | Smith, Jr. et al. | |
| 7,715,956 B2* | 5/2010 | Bryant | B60L 15/38 105/26.05 |
| 8,239,078 B2* | 8/2012 | Siddappa | B61C 17/12 455/92 |
| 8,310,979 B2 | 11/2012 | Mason et al. | |
| 8,494,695 B2* | 7/2013 | Cooper | H04L 67/14 104/88.01 |
| 8,702,043 B2* | 4/2014 | Daum | B61L 3/20 246/167 R |
| 8,935,022 B2* | 1/2015 | Cooper | H04W 74/04 180/14.1 |
| 9,026,038 B2* | 5/2015 | Mason | B61L 15/0027 370/315 |
| 9,365,222 B2* | 6/2016 | Hawthorne | B60T 13/665 |
| 9,379,775 B2* | 6/2016 | Cooper | H04B 3/54 |
| 9,513,630 B2* | 12/2016 | Rajendran | B61L 15/0027 |
| 9,637,147 B2* | 5/2017 | Golden | B61L 15/0072 |
| 9,908,544 B2* | 3/2018 | Seaton | B61L 27/0077 |
| 2003/0144772 A1* | 7/2003 | Proulx | B61L 3/127 701/19 |
| 2003/0214417 A1* | 11/2003 | Peltz | B61L 3/125 340/4.3 |
| 2005/0120904 A1* | 6/2005 | Kumar | B60L 15/32 105/35 |
| 2005/0189815 A1* | 9/2005 | Bryant | B60L 15/38 303/7 |
| 2006/0085103 A1* | 4/2006 | Smith, Jr. | B61L 15/0027 701/19 |
| 2008/0201028 A1* | 8/2008 | Brooks | B61L 3/006 701/20 |
| 2010/0074160 A1* | 3/2010 | Mason | B61L 15/0027 370/315 |
| 2010/0118988 A1* | 5/2010 | Smith, Jr. | B61L 15/0027 375/259 |
| 2010/0130124 A1 | 5/2010 | Teeter et al. | |
| 2010/0204856 A1* | 8/2010 | Smith | B61C 17/12 701/19 |
| 2010/0235017 A1* | 9/2010 | Peltonen | B61L 15/0018 701/2 |
| 2011/0051663 A1* | 3/2011 | Cooper | H04L 67/14 370/328 |
| 2011/0183605 A1* | 7/2011 | Smith, Jr. | B61L 15/0027 455/7 |
| 2012/0264370 A1* | 10/2012 | Smith, Jr. | B61L 15/0027 455/11.1 |
| 2012/0276841 A1* | 11/2012 | Mason | B61L 15/0027 455/7 |
| 2014/0011442 A1* | 1/2014 | Dussmann | H04B 7/15535 455/10 |
| 2014/0188307 A1* | 7/2014 | Cooper | B61C 17/12 701/2 |
| 2015/0025712 A1* | 1/2015 | Rush | B61C 17/12 701/2 |
| 2016/0194014 A1* | 7/2016 | Rajendran | B61L 27/0005 701/2 |
| 2016/0304105 A1* | 10/2016 | Seaton | B61L 27/0077 |
| 2016/0304106 A1* | 10/2016 | Seaton | B61L 27/0061 |
| 2016/0304107 A1* | 10/2016 | Seaton | B61L 27/0077 |
| 2017/0106888 A1* | 4/2017 | Shubs, Jr. | B61L 27/0061 |
| 2017/0272351 A1* | 9/2017 | Wolf | H04L 43/50 |
| 2018/0143623 A1* | 5/2018 | Rush | G05D 1/0011 |

* cited by examiner

VEHICLE COMMUNICATION SYSTEM

FIELD

Embodiments of the subject matter described herein relate to communication between vehicles.

BACKGROUND

Some vehicle systems may be remotely controlled. For example, an operator control device located off-board a vehicle system may wirelessly communicate signals to a communication device onboard one or more vehicles of the vehicle system. These signals may be used to remotely control tractive effort and/or braking effort generated by one or more vehicles of the vehicle system to remotely control movement of the vehicle system from the operator control device.

But, the communication range of the operator control device may be limited. For example, in vehicle systems formed from many vehicles extending over long distances of hundreds of meters, the operator control device may not be able to wirelessly communicate with some of the vehicles in the vehicle system. This can prevent the operator control device from wirelessly controlling the movement of some of the vehicles in the vehicle system.

BRIEF DESCRIPTION

In one embodiment, a communication system includes a first communication device configured to be disposed onboard a first displaced vehicle. The first communication device of the first displaced vehicle is configured to communicate with a second communication device disposed onboard a lead vehicle of a vehicle system for the lead vehicle to remotely control operation of the vehicle system, wherein the first communication device of the first displaced vehicle is configured to receive a reconfiguration signal from the second communication device of the lead vehicle. The system also includes a remote control (RC) communication device also configured to be disposed onboard the first displaced vehicle. The RC communication device is configured to wirelessly receive a control signal from an operator control unit (OCU) for the OCU to remotely control the operation of the first displaced vehicle. The system also includes a communication controller configured to be disposed onboard the first displaced vehicle. The communication controller is configured to, responsive to the first communication device of the first displaced vehicle receiving the reconfiguration signal from the second communication device of the lead vehicle or another reconfiguration signal from an off-board or on-board location, reconfigure the RC communication device to repeat the control signal from the OCU.

In one embodiment, a method for communicating includes wirelessly receiving, at a lead remote control (RC) communication device onboard a lead vehicle of a vehicle system, a request signal from an operator control unit (OCU), communicating a reconfiguration signal from a lead communication device of the lead vehicle to a remote communication device disposed onboard a first displaced vehicle responsive to receipt of the request signal, and, responsive to receiving the reconfiguration signal at the remote communication device, reconfiguring an RC communication device onboard the first displaced vehicle to switch from a first state where the RC communication device onboard the first displaced vehicle receives a control signal from the OCU for remotely controlling operation of the first displaced vehicle from the OCU to a different, second state where the RC communication device onboard the first displaced vehicle repeats the control signal that is communicated from the OCU to the lead RC communication device of the lead vehicle and received by the RC communication device onboard the first displaced vehicle from the lead RC communication device.

In one embodiment, a communication system includes a first communication device configured to be disposed onboard a first displaced vehicle. The first communication device of the first displaced vehicle is configured to wirelessly communicate with a lead communication device disposed onboard a lead vehicle of a vehicle system for the lead vehicle to remotely control operation of the vehicle system. The first communication device of the first displaced vehicle is configured to receive a reconfiguration signal from the lead communication device of the lead vehicle. The system also includes a second communication device also configured to be disposed onboard the first displaced vehicle. The second communication device configured to wirelessly receive a control signal from an operator control unit (OCU) for the OCU to remotely control the operation of the first displaced vehicle. The system also includes a communication controller configured to be disposed onboard the first displaced vehicle. The communication controller is configured to, responsive to the first communication device of the first displaced vehicle receiving the reconfiguration signal from the lead communication device of the lead vehicle or another reconfiguration signal from an off-board location, reconfigure the second communication device to repeat the control signal from the OCU for receipt by one or more second displaced vehicles in the vehicle system.

BRIEF DESCRIPTION OF THE DRAWINGS

The subject matter described herein will be better understood from reading the following description of non-limiting embodiments, with reference to the attached drawings, wherein below.

DETAILED DESCRIPTION

Embodiments of the inventive subject matter described herein relate to increasing the range for remote control of vehicle systems. In one embodiment, the radio coverage range is increased for remotely controlled vehicle applications in distributed power (DP) vehicle systems by re-configuring wireless communication devices (e.g., radios) onboard one or more vehicles for use as temporary and portable repeaters. A DP vehicle system distributes the generation of tractive efforts and/or braking efforts among several vehicles in the vehicle system, with the tractive and/or braking operations of the vehicles being coordinated with each other, such as at a lead vehicle in the vehicle system. The vehicles that are controlled by the lead vehicle can be referred to as remote or displaced vehicles. A displaced vehicle is a vehicle that is separate from another vehicle. For example, in a vehicle system having first, second, and third vehicles, the second and third vehicles may be displaced vehicles relative to the first vehicle, the first and third vehicles may be displaced vehicles relative to the second vehicle, and the first and second vehicles may be displaced vehicles relative to the third vehicle. The lead vehicle may or may not be located at the leading or head end of the vehicle system.

Figure 1:
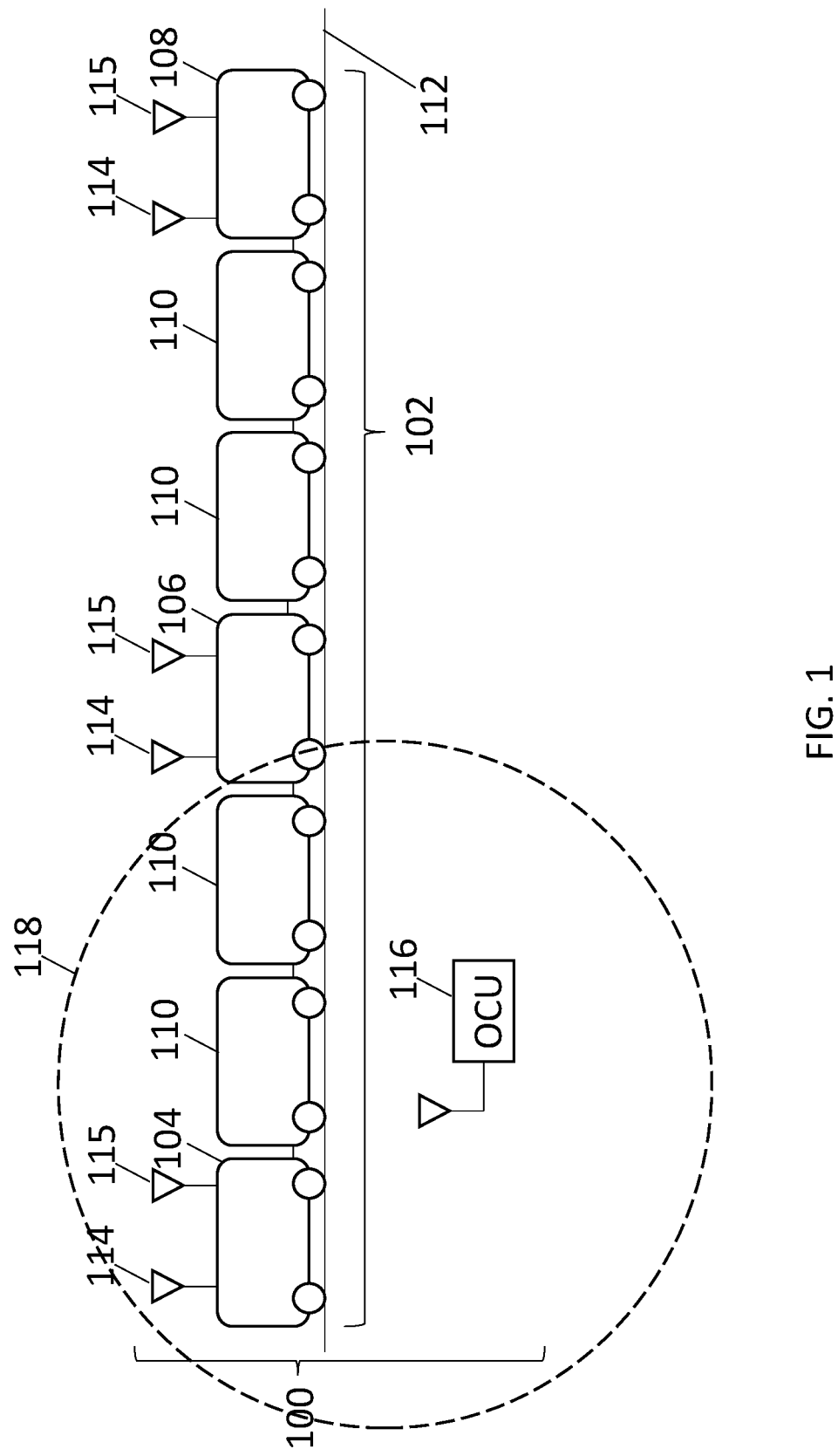
FIG. 1 illustrates a communication system disposed onboard a vehicle system according to one embodiment.

FIG. 1 illustrates a communication system 100 disposed onboard a vehicle system 102 according to one embodiment. The vehicle system 102 includes plural vehicles 104, 106, 108, 110 operably coupled with each other. In one embodiment, the vehicles 104, 106, 108, 110 are mechanically coupled with each other (e.g., by couplers 106) so that the vehicles 104, 106, 108 can push and/or pull on each other to move the vehicle system 102 along a route 112. Alternatively, the vehicles 104, 106, 108, 110 are not mechanically coupled with each other, but are logically coupled with each other by wireless communication links so that the vehicles 104, 106, 108 can communicate with each other to coordinate the movements of the vehicles 104, 106, 108 to move the vehicle system 102 along the route 112. The vehicles 104, 106, 108 are propulsion-generating vehicles and the vehicles 110 are non-propulsion-generating vehicles. The propulsion-generating vehicles can include locomotives, automobiles, trucks, marine vessels, mining vehicles, or other off-highway vehicles (e.g., vehicles that are not designed or are not legally permitted for travel on public roadways). The non-propulsion-generating vehicles can include rail cars, trailers, barges, or the like. While the description herein focuses on the vehicles 104, 106, 108 being remotely controlled, optionally, one or more of the non-propulsion-generating vehicles 110 may be remotely controlled (e.g., to engage or disengage brakes of the vehicles 110). The number and arrangement of the vehicles 104, 106, 108, 110 in the vehicle system 102 are provided as one example, and are not limiting on all embodiments of the inventive subject matter described herein. The route 112 can include one or more tracks, roads, waterways, etc.

The communication system 100 includes communication devices 114, 115 disposed onboard the vehicles 104, 106, 108 and an operator control unit (OCU) 116. The communication devices 114 represent hardware circuitry that enables wireless communication between the vehicle system 102 and the OCU 116. For example, the communication devices 114 can represent antennas, transceiving circuitry, modems, etc. The communication devices 114 optionally may include one or more processors (e.g., microprocessors, integrated circuits, and/or field programmable gate arrays) for controlling operation of the communications to and/or from the devices 114. The communication devices 114 may be referred to as remote control communication devices 114, RC communication devices 114, or RC radios 114.

The OCU 116 is device that wirelessly communicates control signals with the vehicle system 102 to control movement of the vehicle system 102. For example, the OCU 116 may be a remote control for the vehicle system 102. While the OCU 116 is shown in FIG. 1 as being off-board the vehicle system 102, alternatively, the OCU 116 may be onboard the vehicle system 102. The OCU 116 may differ from remote controls for miniature or model vehicle systems in that the OCU 116 may control movement of much larger and heavier vehicles than miniature or model vehicles.

The communication devices 115 represent hardware circuitry that enables wireless communication between the vehicles 104, 106, 108 of the vehicle system 102. For example, the communication devices 115 can represent antennas, transceiving circuitry, modems, etc. The communication devices 115 optionally may include one or more processors (e.g., microprocessors, integrated circuits, and/or field programmable gate arrays) for controlling operation of the communications to and/or from the devices 115. The communication devices 115 may be referred to as non-remote control (non-RC) communication devices 115 or a device that allow for wireless or wired communication between vehicles. The non-RC communication devices 115 may be used to communicate information between the vehicles 104, 106, 108 to coordinate the movements of the vehicles 104, 106, 108 in propelling the vehicle system 102. For example, the communication device 115 onboard the vehicle 104 may issue control or command signals to the communication devices 115 onboard the vehicles 106, 108 to instruct which throttle positions or settings that the vehicles 106, 108 are to use to propel the vehicle system 102 and/or which brake positions or settings that the vehicles 106, 108 are to use to stop or slow movement of the vehicle system 102.

In operation, the OCU 116 can wirelessly communicate control signals to the communication device 114 of one or more of the vehicles 104, 106, 108 to remotely control movement of the vehicles 104, 106, 108. The communication devices 114 of the vehicles 104, 106, 108 may be configured, in one state, to wirelessly communicate directly with the OCU 116 to permit the OCU 116 to wirelessly control the movement of the vehicles 104, 106, 108, and therefore the vehicle system 102. For example, the direct communication of a control signal involves the OCU 116 wirelessly communicating the control signal to a communication device 114, without the control signal being received and sent (or repeated) by any other intervening communication devices.

The direct range of the communication devices 114 of the vehicles 104, 106, 108 and/or the OCU 116 may be limited such that a control signal communicated from the OCU 116 or a communication device 114 is unable to reach the communication device 114 of one or more of the vehicles 104, 106, 108. For example, a communication range 118 of the OCU 116 can represent a spatial distance within which the OCU 116 can successfully communicate a control signal to a communication device 114 of a vehicle 104, 106, 108. The range 118 may represent a sphere or other shape that, when a communication device 114 is inside the range 118, the communication device 114 can receive a control signal directly from the OCU 116. When a communication device 114 is outside the communication range 118, the communication device 114 is unable to receive the control signal from the OCU 116. Although not shown in FIG. 1, the communication devices 114 may each have a similar, limited direct communication range in which wireless signals may be communicated.

Due to the long length of some vehicle systems 102, this communication range 118 may be insufficient for the OCU 116 to be able to communicate with each of the vehicles 104, 106, 108. For example, the OCU 116 may be unable to directly communicate with the communication devices 114 of the vehicles 106, 108.

The communication range of the OCU 116 and/or one or more of the communication devices 114 can be effectively increased by use of communication repeaters within the vehicle system 102. This can allow for expanded communication coverage for operations of the vehicle system 102, as well as provide a single operator of the OCU 116 with the ability to remotely control movement of all vehicles 104, 106, 108 in the vehicle system 102.

In operation, the OCU 116 may request a communication link between the OCU 116 and the RC communication device 114, such as the communication device 114 onboard the lead vehicle 104. The RC communication device 114 with which a communication link is established with the OCU 116 can direct the communication device 115 onboard the lead vehicle 104 to communicate a reconfiguration signal to one or more other communication devices 115 onboard one or more other vehicles 106, 108. The reconfiguration signal is received by the communication devices 115 onboard the vehicles 106, 108. Receipt of a reconfiguration signal at a communication device 115 onboard a vehicle causes the RC communication device 114 onboard the same vehicle to operate as a repeater that repeats future signals between the RC communication device 114 of the vehicle 104 and OCU 116 for receipt by the RC communication devices 114 of the vehicles 106, 108. For example, the RC communication devices 114 that are directed to operate as repeaters may switch from one configuration state where the RC communication devices 114 can communicate directly with the OCU 116 for remote control of the vehicles 106, 108 to a different configuration state where the RC communication devices 114 do not communicate directly with the OCU 116, but instead operate by receiving and repeating control signals from the RC communication device 114 of the lead vehicle 104 and OCU 116.

For example, after the RC communication device 114 of the vehicle 106 changes configurations to act as a repeater, in turn, this creates additional communications paths (similar to depiction of 118), the OCU 116 can communicate a control signal to the RC communication device 114 of the lead vehicle 104. This control signal can dictate one or more throttle settings to which the vehicles 104 is to switch. The RC communication device 114 of the lead vehicle 104 may convey this control signal to the vehicle controller of the lead vehicle 104, and also communicate the control signal to via lead vehicle device 115 to the communication device 115 of the vehicle 106. In one embodiment, only a single RC communication device 114 of a single vehicle in the vehicle system 102 operates as a repeater to avoid interference (e.g., in the same time slot of a time division multiple access method of communication). Alternatively, two or more RC communication devices 114 of two or more vehicles in the vehicle system 102 may operate as repeaters.

In one embodiment, the communication devices 114, 115 include radios that communicate wireless radio frequency (RF) signals. Alternatively, the communication devices 114, 115 are another type of wireless communication device 114. During the linking process between the OCU 116 and the RC communication device 114 of the lead vehicle 104, the RC communication device 114 of the lead vehicle 104 may utilize a different communication medium or technique in order to instruct the one or more other RC communication devices 114 of the vehicles 106, 108 to operate as a repeater. This different medium or technique may be wireless communication of the signal via a cellular signal, via a positive train control link, via a signal communicated using the IEEE 802.11 standard(s), a wired communication path (such as ECP brake system), etc.

The RC communication device 114 that is re-configured to operate as a repeater may continue to operate by repeating control signals received from the OCU 116 and/or RC communication device 114 of the lead vehicle 104 until a designated, non-zero period of time expires, until the vehicle system 102 reaches a designated location (e.g., a final or intermediate destination of a trip, a location where the OCU 116 has increased range, etc.), and/or until the communication link between the OCU 116 and the RC communication device 114 of the lead vehicle 104 is terminated.

The RC communication device 114 that is reconfigured to operate as a repeater may use the frequencies previously used by the RC communication devices 114 and/or OCU 116 for communication. This can help avoid having to obtain additional permissions or licenses from regulatory bodies to use other, different frequencies for communication. For example, the RC communication devices 114 may wirelessly communicate with the OCU 116 for direct remote control of the vehicles 104, 106, 108 by the OCU 116 and may wirelessly operate as repeaters using the same frequency or frequencies.

Figure 2:
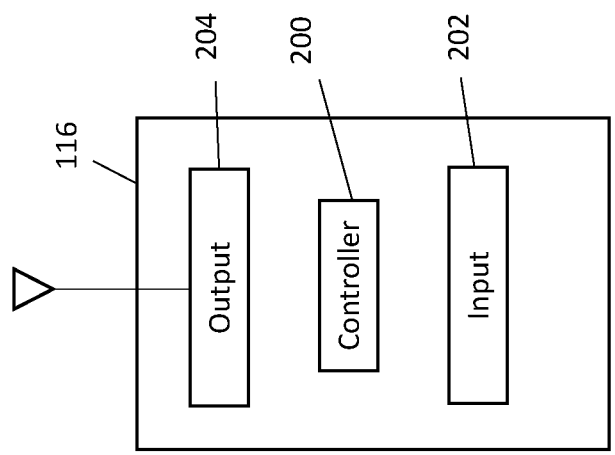
FIG. 2 illustrates one embodiment of an operator control unit shown in FIG. 1.

FIG. 2 illustrates one embodiment of the OCU 116 shown in FIG. 1. The OCU 116 includes a controller 200, which represents hardware circuitry that includes and/or is connected with one or more processors (e.g., microprocessors, field programmable gate arrays, and/or integrated circuits) that control operation of the OCU 116 based on input received from one or more input devices 202 ("Input" in FIG. 2). The input devices 202 may include one or more buttons, switches, levers, touchscreens, keyboards, speakers, wheels, pedals, etc., that are manipulated by an operator to indicate changes in operational settings of the vehicle system 102 (shown in FIG. 1), such as throttle settings, brake settings, etc. One or more output devices 204 can include a communication device of the OCU 116, such as a radio, transceiver, etc., and associated circuitry (e.g., modems, antennas, etc.), for wirelessly communicating signals with one or more of the communication devices 114 of the vehicle system 102 shown in FIG. 1. The output devices 204 optionally may include one or more displays, speakers, lights, audible alarms, etc. In operation, the operator manipulates the input device(s) 202 to instruct the controller 200 how to change or otherwise control movement of the vehicles 104, 106, 108 shown in FIG. 1 and/or the vehicle system 102. The controller 200 receives the input (e.g., as electric signals communicated from the input devices 202) and generates a signal that is communicated to the output device 204 for wirelessly communicating the signal to the vehicle system 102.

Figure 3:
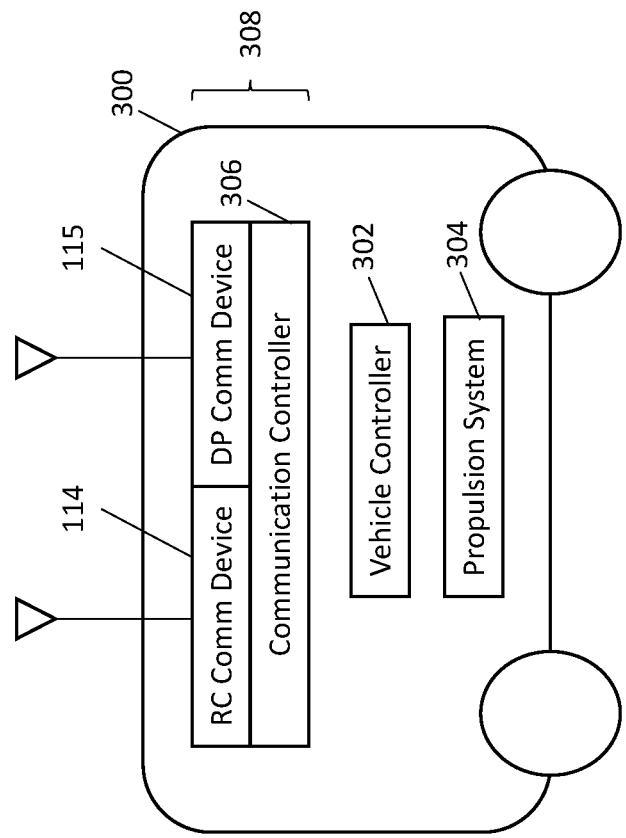
FIG. 3 illustrates one embodiment of a vehicle.

FIG. 3 illustrates one embodiment of a vehicle 300. The vehicle 300 may represent one or more of the vehicles 104, 106, 108 shown in FIG. 1. The vehicle 300 includes the RC communication device 114 and a communication device 115 described above. If the vehicle 300 represents a lead vehicle in the DP configuration of the vehicle system 102 shown in FIG. 1 (e.g., the vehicle that controls operations of other vehicles in the vehicle system), then the communication device 115 optionally may be referred to as a lead DP communication device. If the vehicle 300 represents a remote vehicle in the DP configuration, then a communication device 115 of the vehicle 300 optionally may be referred to as a remote DP communication device.

The communication devices 114, 115 may be controlled by a communication controller 306 onboard the vehicle 300. The communication controller 306 represents hardware circuitry that includes and/or is connected with one or more processors (e.g., microprocessors, integrated circuits, field programmable gate arrays, etc.) that control operation and configurations of the devices 114, 115. For example, the communication controller 306 may dictate and/or limit what signals are communicated by the devices 114, 115. In one embodiment, the controller 306 can re-configure the device 114 to operate as a repeater responsive to receiving a reconfiguration signal from off-board the vehicle 300, as described herein. The communication devices 114, 115 and the communication controller 306 onboard the vehicle 300 may be referred to as a communication assembly 308 of the vehicle 300.

The communication devices 114, 115 may represent different radios communicating at different designated frequencies. As described above, the communication device 114 may use radio communications at a designated frequency or frequencies of the OCU 116, while the communication device 115 may use radio communications at another, different designated frequency or frequencies of the other communication devices 115 of the vehicle system 102. Operation of the communication devices 114, 115 may be controlled by a communication controller A vehicle controller 302 represents hardware circuitry that includes and/or is connected with one or more processors (e.g., microprocessors, field programmable gate arrays, and/or integrated circuits) that control operation of the vehicle 300. The controller 302 can generate and communicate control signals to a propulsion system 304 of the vehicle 300 to control movement of the vehicle 300. For example, the propulsion system 304 may include one or more motors, engines, alternators, brakes, etc., that receive the control signal from the controller 302 and change operations (e.g., throttle settings, brake settings, etc.) based on the control signal. The controller 302 can receive the control signal from the RC communication device 114 and/or the communication device 115 as described above. Optionally, the controller 302 can receive the control signal from one or more input devices onboard the vehicle 300, similar to the input devices of the OCU 116.

In operation, the RC communication devices 114 of the lead and remote vehicles 104, 106, 108 may operate in a first state or configuration by receiving control signals from the OCU 116 to allow the OCU 116 to control movement of the vehicles 104, 106, 108. The OCU 116 may communicate a request signal to the lead communication device 114, such as a linking signal that requests that the lead communication device 114 establish a communication link with the OCU 116. Responsive to receiving this request signal, the lead RC communication device 114 and the OCU 116 establish a wireless communication link to allow the OCU 116 to communicate control signals with the lead RC communication device 114. The lead communication device 115 may communicate a reconfiguration signal to the remote communication device 115 onboard a remote vehicle 106 (or another remote vehicle 108). This reconfiguration signal directs the remote RC communication device 114 to change states or configurations and operate as a repeater of future signals received from the lead RC communication device 114. The remote communication device 115 that receives the reconfiguration signal may then stop allowing the OCU 116 to directly communicate with the remote RC communication device 114 for remote control of the vehicle 106, and switch to repeating control signals received from the lead RC communication device 114 (which were previously received by the lead communication device 114 from the OCU 116). The remote RC communication device 114 of the vehicle 106 may return to allowing direct communication with the OCU 116 by reconfiguring the remote RC communication device 114 responsive to expiration of a designated, non-zero period of time and/or receipt of an unlink command at the remote communication device 115 from the lead communication device 115. The lead communication device 115 may communicate the unlink command responsive to the communication link between the lead RC communication device 114 and the OCU 116 being terminated, broken, or interrupted.

Figure 4:
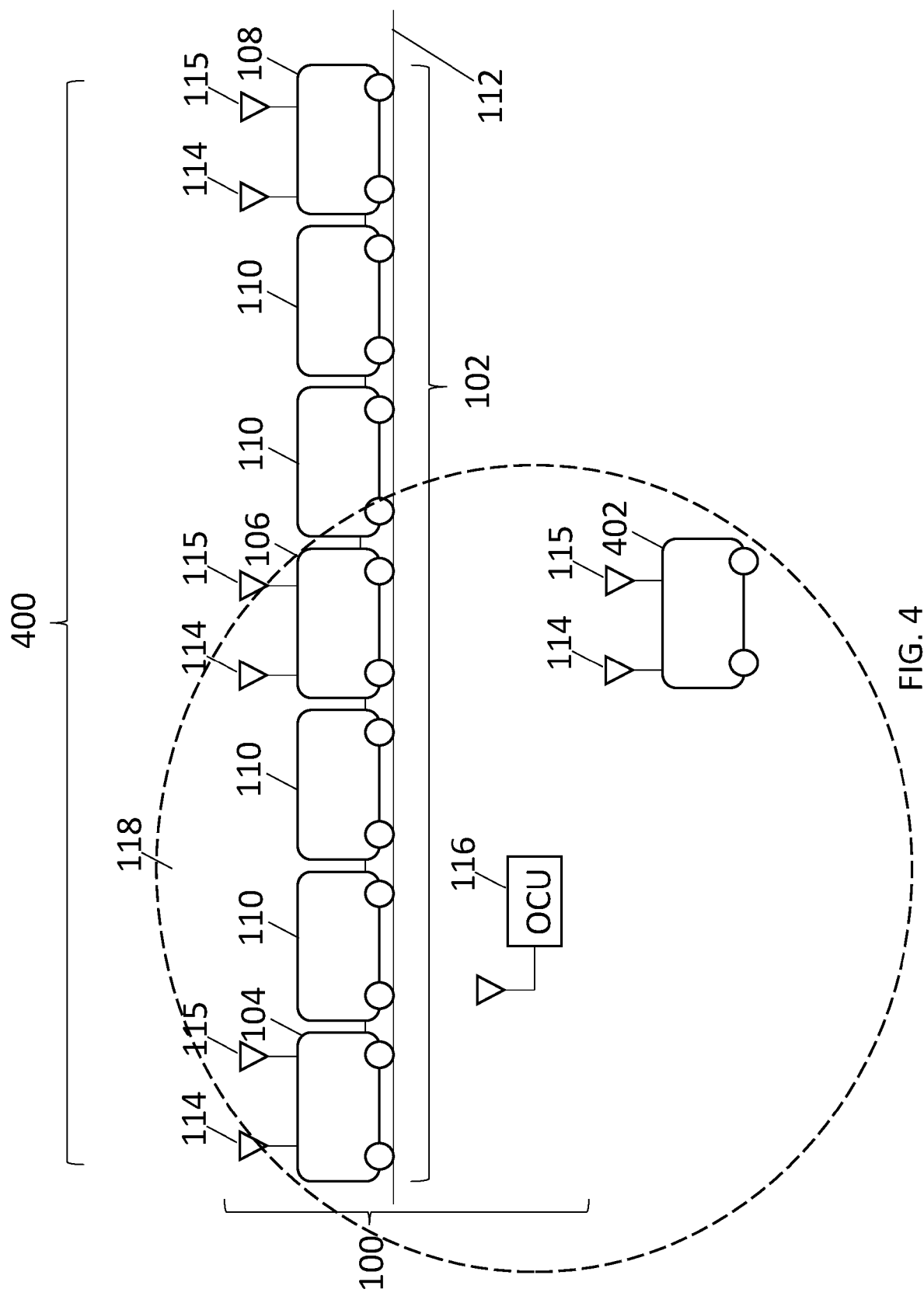
FIG. 4 illustrates a communication system disposed onboard multiple vehicle systems according to one embodiment.

FIG. 4 illustrates a communication system 400 disposed onboard multiple vehicle systems according to one embodiment. In contrast to the communication system 100 shown in FIG. 1, the communication system 400 may include an external vehicle 402 that includes the communication devices 114, 115. The vehicle 402 is external to the vehicle system 102 in that the vehicle 402 is not included in and does not travel in the vehicle system 102. For example, the vehicle 402 may be included in another, different, and separate vehicle system than the vehicle system 102.

In operation, the RC communication device 114 of the lead vehicle 104 can, responsive to receiving the request or linking signal from the OCU 116, communicate a wireless signal to the communication device 115 of the external vehicle 402 to request that the external vehicle 402 operate as a repeater (by reconfiguring device 114 as repeater), similar to as described above. For example, instead of using the RC communication device 114 onboard a vehicle in the vehicle system 102 as the repeater, the communication system 400 shown in FIG. 4 can send a reconfiguration request signal or command from the communication device 114 onboard the vehicle system 102 to the communication device 114 of the external vehicle 402. Upon receipt of this signal, the communication controller 306 of the external vehicle 402 can reconfigure the RC communication device 114 of the external vehicle 402 to operate as the repeater. The RC communication device 114 of the vehicle 402 may then operate as a repeater, as described above.

Figure 5:
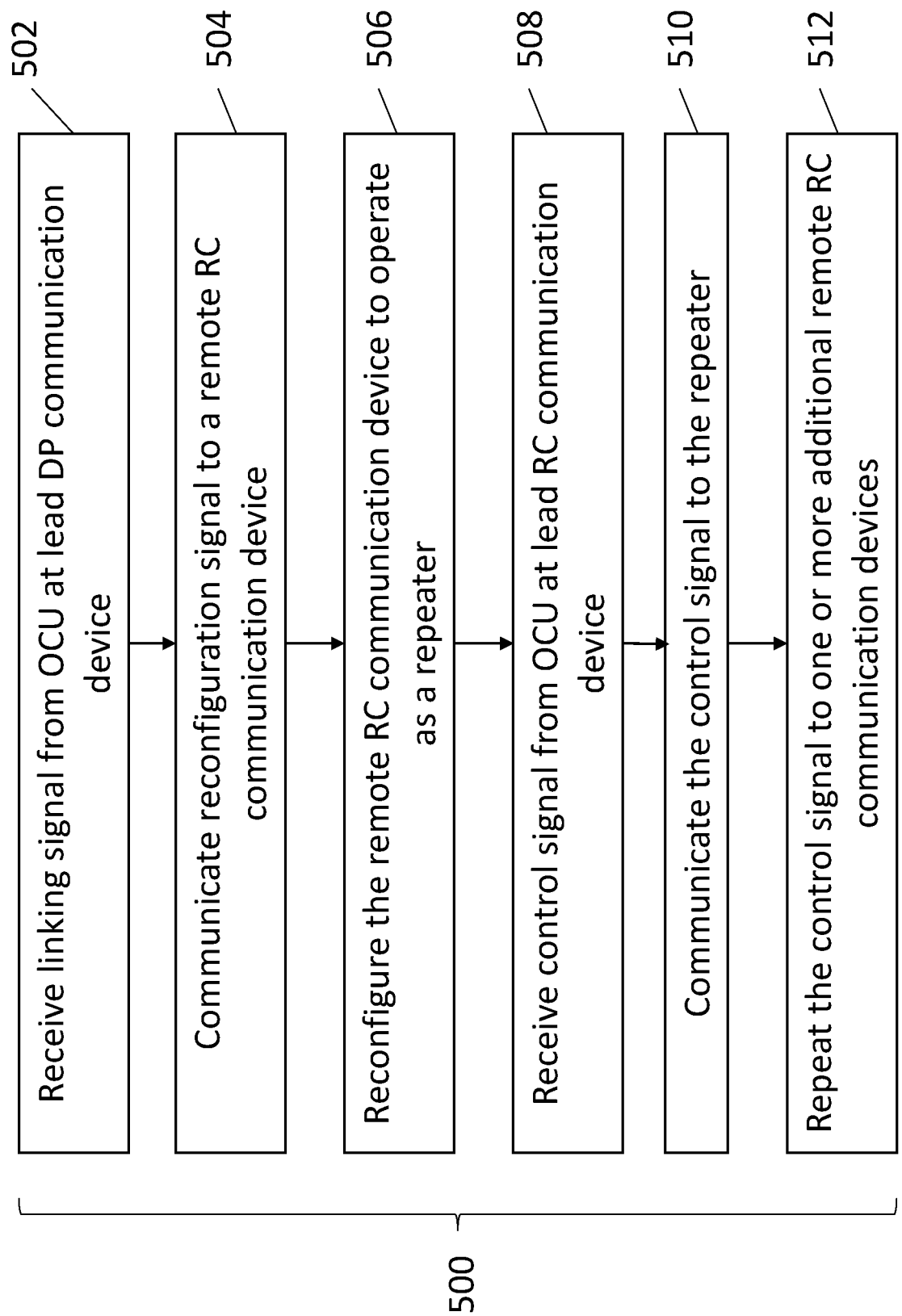
FIG. 5 illustrates a flowchart of one embodiment of a method for communicating with and/or within a vehicle system.

FIG. 5 illustrates a flowchart of one embodiment of a method 500 for communicating with and/or within a vehicle system. The method 500 may be performed by one or more embodiments of the communication systems 100, 400 shown and described above in connection with FIGS. 1-4. The method 500 can represent operations performed by the communication devices 114, 115 and/or communication controller 306 described herein. In embodiment, the method 500 can represent software operating on the processors described herein, or may be used to create software for use in directing the operations of the processors described herein.

At 502, a linking signal is received at a lead communication device onboard a vehicle of a vehicle system from an OCU. This linking signal may request that a communication link be established between the lead communication device and the OCU to allow the OCU to remotely control movement of the vehicle on which the lead communication device is disposed.

At 504, a reconfiguration signal is communicated from the lead communication device to a remote communication device disposed onboard another vehicle in response to receipt of the linking signal received at the lead communication device. This signal may be communicated from a communication device of a lead vehicle (or other vehicle) as the lead communication device to a communication device of another vehicle. The remote communication device may be onboard a vehicle within the same vehicle system as the vehicle in which the lead communication device is disposed, or may be onboard a vehicle that is not in the same vehicle system as the vehicle in which the lead communication device is disposed.

At 506, the remote communication device onboard the other vehicle receives the reconfiguration signal and, responsive to receipt of this signal, an RC communication device of the other vehicle is reconfigured to operate as a repeater responsive to receiving the reconfiguration signal. Prior to being reconfigured, the RC communication device may be configured to directly communicate with the OCU to allow the OCU to directly control the movement of the vehicle on which the RC communication device is disposed, without the control signals communicated from the OCU being previously communicated to another device. After being reconfigured, the RC communication device may no longer be configured to directly communicate with the OCU, but may be configured to repeat control signals. For example, the reconfigured RC communication device may receive a control signal originated by the OCU, but that is received from another communication device, such as the RC communication device onboard the lead vehicle.

At 508, a control signal from the OCU is received at the RC communication device onboard the lead vehicle. This control signal may direct one or more operational settings of one or more vehicles in the vehicle system, such as a throttle setting, a brake setting, a speed, etc. Optionally, the control signal may be implemented by the vehicle on which the RC communication device is disposed. At 510, the control signal is communicated from the RC communication device to the reconfigured RC communication device on another vehicle.

At 512, the control signal received at the reconfigured RC communication device is repeated. The reconfigured RC communication device may transmit and/or broadcast the received control signal that originated at the OCU in order to increase the effective range of the OCU.

In one embodiment, a communication system includes a first communication device configured to be disposed onboard a first displaced vehicle. The first communication device of the first displaced vehicle is configured to communicate with a second communication device disposed onboard a lead vehicle of a vehicle system for the lead vehicle to remotely control operation of the vehicle system, wherein the first communication device of the first displaced vehicle is configured to receive a reconfiguration signal from the second communication device of the lead vehicle. The system also includes a remote control (RC) communication device also configured to be disposed onboard the first displaced vehicle. The RC communication device is configured to wirelessly receive a control signal from an operator control unit (OCU) for the OCU to remotely control the operation of the first displaced vehicle. The system also includes a communication controller configured to be disposed onboard the first displaced vehicle. The communication controller is configured to, responsive to the first communication device of the first displaced vehicle receiving the reconfiguration signal from the second communication device of the lead vehicle or another reconfiguration signal from an off-board or on-board location, reconfigure the RC communication device to repeat the control signal from the OCU.

In one example, the RC communication device includes a radio configured to communicate with the OCU via a wireless radio frequency signal.

In one example, prior to first communication device of the first displaced vehicle receiving the reconfiguration signal from the second communication device of the lead vehicle or the another reconfiguration signal, the RC communication device of the first displaced vehicle is configured to wirelessly receive the control signal from the OCU for the OCU to directly and remotely control the operation of the lead vehicle or the vehicle system.

In one example, subsequent to the first communication device of the first displaced vehicle receiving the reconfiguration signal from the second communication device of the lead vehicle or the another reconfiguration signal, the RC communication device of the first displaced vehicle is configured to wirelessly repeat the control signal received from the OCU and a control signal received from an RC communication device disposed onboard the lead vehicle.

In one example, the RC communication device is reconfigured and returned to wirelessly receiving the control signal directly and remotely from the OCU for the OCU to directly and remotely control the operation of the first displaced vehicle responsive to one or more of expiration of a designated, non-zero period of time or receipt of an unlink command.

In one example, the remote RC communication device is configured to be disposed onboard the first displaced vehicle that also is included in the vehicle system formed from the lead vehicle and one or more second displaced vehicles. The lead vehicle, the first displaced vehicle, and the one or more second displaced vehicles can be configured to travel together along a route.

In one example, the remote RC communication device is configured to be disposed onboard the first displaced vehicle that is outside of the vehicle system formed from the lead vehicle and one or more second displaced vehicles. The lead vehicle and the one or more second displaced vehicles can be configured to travel together along a route with the remote RC communication device of the first displaced vehicle repeating the control signal received from the lead vehicle without the first displaced vehicle also moving along the route with the lead vehicle and the one or more second displaced vehicles.

In one embodiment, a method for communicating includes wirelessly receiving, at a lead remote control (RC) communication device onboard a lead vehicle of a vehicle system, a request signal from an operator control unit (OCU), communicating a reconfiguration signal from a lead communication device of the lead vehicle to a remote communication device disposed onboard a first displaced vehicle responsive to receipt of the request signal, and, responsive to receiving the reconfiguration signal at the remote communication device, reconfiguring an RC communication device onboard the first displaced vehicle to switch from a first state where the RC communication device onboard the first displaced vehicle receives a control signal from the OCU for remotely controlling operation of the first displaced vehicle from the OCU to a different, second state where the RC communication device onboard the first displaced vehicle repeats the control signal that is communicated from the OCU to the lead RC communication device of the lead vehicle and received by the RC communication device onboard the first displaced vehicle from the lead RC communication device.

In one example, the method also includes receiving the reconfiguration signal at the remote communication device. Prior to receiving the reconfiguration signal at the remote communication device, the RC communication device onboard the first displaced vehicle operates in the first state to wirelessly receive the control signal from the OCU for the OCU to directly and remotely control the operation of the first displaced vehicle.

In one example, subsequent to receiving the reconfiguration signal at the remote communication device, the RC communication device onboard the first displaced vehicle operates in the second state to wirelessly repeat the control signal received from the OCU or from the lead RC communication device.

In one example, the method also includes re-configuring the RC communication device onboard the first displaced vehicle to return to wirelessly receiving the control signal directly and remotely from the OCU for the OCU to directly and remotely control the operation of the first displaced vehicle responsive to one or more of expiration of a designated, non-zero period of time or receipt of an unlink command.

In one example, the request signal is wirelessly received at the lead communication device from the OCU via a wireless signal other than a radio signal.

In one example, the reconfiguration signal is wirelessly communicated to the remote communication device disposed onboard the first displaced vehicle that also is included in the vehicle system formed from the lead vehicle and one or more second displaced vehicles.

In one example, the reconfiguration signal is communicated to the remote communication device disposed onboard the first displaced vehicle that is outside of the vehicle system formed from the lead vehicle and one or more second displaced vehicles.

In one embodiment, a communication system includes a first communication device configured to be disposed onboard a first displaced vehicle. The first communication device of the first displaced vehicle is configured to wirelessly communicate with a lead communication device disposed onboard a lead vehicle of a vehicle system for the lead vehicle to remotely control operation of the vehicle system. The first communication device of the first displaced vehicle is configured to receive a reconfiguration signal from the lead communication device of the lead vehicle. The system also includes a second communication device also configured to be disposed onboard the first displaced vehicle. The second communication device configured to wirelessly receive a control signal from an operator control unit (OCU) for the OCU to remotely control the operation of the first displaced vehicle. The system also includes a communication controller configured to be disposed onboard the first displaced vehicle. The communication controller is configured to, responsive to the first communication device of the first displaced vehicle receiving the reconfiguration signal from the lead communication device of the lead vehicle or another reconfiguration signal from an off-board location, reconfigure the second communication device to repeat the control signal from the OCU for receipt by one or more second displaced vehicles in the vehicle system.

In one example, the first communication device includes a distributed power communication device.

In one example, the second communication device includes a remote control communication device.

In one example, prior to the first communication device of the first displaced vehicle receiving the reconfiguration signal from the lead communication device of the lead vehicle or the another reconfiguration signal, the second communication device of the first displaced vehicle is configured to wirelessly receive the control signal from the OCU for the OCU to directly and remotely control the operation of the lead vehicle or the vehicle system. Subsequent to the first communication device of the first displaced vehicle receiving the reconfiguration signal from the lead communication device of the lead vehicle or the another reconfiguration signal, the second communication device of the first displaced vehicle is configured to wirelessly repeat the control signal received from the OCU and a control signal received from a second communication device disposed onboard the lead vehicle. The second communication device of the first displaced vehicle can be configured to re-configure and return to wirelessly receiving the control signal directly and remotely from the OCU for the OCU to directly and remotely control the operation of the first displaced vehicle responsive to one or more of expiration of a designated, non-zero period of time or receipt of an unlink command.

In one example, the second communication device is configured to be disposed onboard the first displaced vehicle that also is included in the vehicle system formed from the lead vehicle and the one or more second displaced vehicles. The lead vehicle, the first displaced vehicle, and the one or more second displaced vehicles can be configured to travel together along a route.

In one example, the second communication device is configured to be disposed onboard the first displaced vehicle that is outside of the vehicle system formed from the lead vehicle and the one or more second displaced vehicles. The lead vehicle and the one or more second displaced vehicles can be configured to travel together along a route with the second communication device of the first displaced vehicle repeating the control signal received from the lead vehicle to at least one of the one or more second displaced vehicles for remotely controlling operation of the vehicle system without the first displaced vehicle also moving along the route with the lead vehicle and the one or more second displaced vehicles.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle communication system configured to be disposed onboard a vehicle system having at least a lead vehicle, a first remote vehicle, and a second remote vehicle, the vehicle communication system comprising:
    a remote distributed power radio configured to be disposed onboard the lead vehicle, the remote distributed power radio configured to wirelessly send a first control signal that originates at the lead vehicle to at least the first remote vehicle;
    a remote controller configured to be disposed onboard the first remote vehicle and to change movement of the first remote vehicle based on the first control signal received from the lead vehicle; and
    a remote control communication device also configured to be disposed onboard the first remote vehicle, the remote control communication device configured to wirelessly receive a second control signal that originates at an operator control unit located offboard the vehicle system and offboard any vehicle for the operator control unit to remotely control the movement of the first remote vehicle,
    wherein the remote controller is configured to reconfigure the remote control communication device to repeat the second control signal received from the operator control unit to at least the second remote vehicle.

2. The vehicle communication system of claim 1, wherein the remote control communication device includes a radio configured to communicate with the operator control unit via a wireless radio frequency signal.

3. The vehicle communication system of claim 1, wherein, prior to the remote distributed power radio of the first remote vehicle being reconfigured by the remote controller, the remote control communication device of the first remote vehicle is configured to wirelessly receive the second control signal from the operator control unit and to change the movement of only the first remote vehicle.

4. The vehicle communication system of claim 1, wherein the remote control communication device is re-configured to no longer repeat the second control signal from the operator control unit and to return to repeating the first control signal from the lead vehicle responsive to expiration of a designated, non-zero period of time following receipt of the second control signal from the operator control unit.

5. The vehicle communication system of claim 1, wherein the lead vehicle, the first remote vehicle, and the second remote vehicle are connected to travel together along a route.

6. The vehicle communication system of claim 5, wherein the remote control communication device is a first remote control communication device, and further comprising:
    a second remote control communication device configured to be disposed onboard a third vehicle that is not mechanically interconnected with any of the lead vehicle, the first remote vehicle, or the second remote vehicle,
    wherein the second remote control communication device is re-configured to receive and repeat the second control signal received from the operator control unit without the third vehicle moving along the route with the lead locomotive, the first remote vehicle, and the second remote vehicle responsive to receipt of the second control signal by the first remote vehicle.

7. A vehicle communication system comprising:
    a distributed power communication device disposed onboard each vehicle of several vehicles in a vehicle system, each of the distributed power communication devices configured to repeat a distributed power control signal among each other, the distributed power control signal causing a vehicle controller onboard each of the vehicles that receives the distributed power control signal to change one or more of a throttle setting or a brake setting of the vehicle; and
    a remote control communication device disposed onboard each of the vehicles in the vehicle system, each of the remote control communication devices configured to directly communicate with an operator control unit that is disposed off-board the vehicle system and disposed off-board all other vehicles while the remote control communication device is in a first configuration, at least one of the remote control communication devices configured to directly receive a remote control signal from the operator control unit without repeating the remote control signal to any other remote control communication device while operating in the first configuration, the remote control signal causing the vehicle controller disposed onboard one of the vehicles that receives the remote control signal directly from the operator control unit to change one or more of the throttle setting or the brake setting of the vehicle,
    wherein the remote control communication devices are configured to change to a different, second configuration in which the remote control communication devices receive and repeat the remote control signal from the operator control unit to one or more other remote control communication devices of the remote control communication devices in the vehicle system to change the one or more of the throttle setting or the brake setting of the vehicles.

8. The vehicle communication system of claim 7, wherein one or more of the remote control communication devices in the vehicle system do not directly receive the remote control signal from the operator control unit due to the one or more remote control communication devices being located outside of a wireless range of the operator control unit.

9. The vehicle communication system of claim 8, wherein the one or more remote control communication devices that do not directly receive the remote control signal from the operator control unit receive the remote control signal from at least one other remote control communication device of the remote control communication devices onboard the vehicle system.

10. The vehicle communication system of claim 7, further comprising:
a controller disposed onboard each of the vehicles in the vehicle system, the controllers configured to automatically control propulsion systems of the vehicles based on the distributed power control signal and the remote control signal to change movement of the vehicle system.

11. A method comprising:
communicating a first distributed power control signal from a distributed power communication device onboard a lead vehicle to a first remote vehicle of a vehicle system, the vehicle system including the lead vehicle, the first remote vehicle, and a second remote vehicle;
changing movement of the first remote vehicle with a remote controller onboard the first remote vehicle based on the first distributed power control signal received from the distributed power communication device;
receiving a second distributed power control signal at a remote control communication device onboard the first remote vehicle from an operator control unit located offboard the vehicle system and offboard any vehicle, wherein the operator control unit is configured to remotely control the movement of the first remote vehicle; and
reconfiguring the remote control communication device with the remote controller to repeat the second distributed power control signal received from the operator control unit to at least the second remote vehicle.

* * * * *

UNITED STATES PATENT AND TRADEMARK OFFICE
CERTIFICATE OF CORRECTION

PATENT NO. : 10,543,860 B2  
APPLICATION NO. : 15/242832  
DATED : January 28, 2020  
INVENTOR(S) : Maurice Stanley Hutchins and Gary William Mason Page 1 of 1

It is certified that error appears in the above-identified patent and that said Letters Patent is hereby corrected as shown below:

On the Title Page

In item (73) Assignee: Assignee's name is: GE GLOBAL SOURCING LLC

Signed and Sealed this  
Thirty-first Day of March, 2020

Andrei Iancu  
*Director of the United States Patent and Trademark Office*